United States Patent
Bicknell et al.

(10) Patent No.: US 6,831,831 B2
(45) Date of Patent: Dec. 14, 2004

(54) DISC STORAGE SUBSYSTEM HAVING IMPROVED RELIABILITY

(76) Inventors: Bruce A Bicknell, 980 N. Arm Dr., Mound, MN (US) 55364; Krish L Kawlra, 8580 Magnolia Trail, Apt. 211, Eden Prairie, MN (US) 55344

( * ) Notice: Subject to any disclaimer, the term of this patent is extended or adjusted under 35 U.S.C. 154(b) by 164 days.

(21) Appl. No.: 10/393,274

(22) Filed: Mar. 20, 2003

(65) Prior Publication Data

US 2003/0193776 A1 Oct. 16, 2003

Related U.S. Application Data

(60) Provisional application No. 60/372,737, filed on Apr. 11, 2002.

(51) Int. Cl.$^7$ ................................................. G06F 1/16
(52) U.S. Cl. ........................ 361/685; 361/799; 710/100; 312/223.2
(58) Field of Search ................................ 361/679–682, 361/724–722, 760, 788, 799; 174/51; 439/61, 65; 312/223.1, 223.6; 364/708.1; 710/1, 100

(56) References Cited

U.S. PATENT DOCUMENTS

| | | | |
|---|---|---|---|
| 563,767 A | 7/1896 | Houard | 273/978 |
| 4,639,863 A | 1/1987 | Harrison et al. | 360/97.01 |
| 5,077,683 A | 12/1991 | Aydin | 361/686 |
| 5,195,022 A | 3/1993 | Hoppal et al. | 361/685 |
| 5,515,515 A | 5/1996 | Kennedy et al. | 710/302 |
| 5,575,529 A | * 11/1996 | Dowdy et al. | 312/223.2 |
| 5,579,204 A | 11/1996 | Nelson et al. | 361/688 |
| 5,689,401 A | 11/1997 | Shikano | 361/685 |
| 5,731,951 A | 3/1998 | Michaud et al. | 361/685 |
| 5,822,184 A | * 10/1998 | Rabinovitz | 361/685 |
| 6,058,019 A | * 5/2000 | Graves et al. | 361/760 |
| 6,137,679 A | 10/2000 | Chang | 361/685 |
| 6,188,571 B1 | 2/2001 | Roganti et al. | 361/685 |
| 6,313,984 B1 | 11/2001 | Furay | 361/685 |
| 6,341,068 B1 | 1/2002 | Bradley et al. | 361/685 |
| 6,366,457 B1 | 4/2002 | Otto et al. | 361/685 |

* cited by examiner

Primary Examiner—Hung Van Duong
(74) Attorney, Agent, or Firm—Jennifer M. Buenzow

(57) ABSTRACT

A disc storage subsystem includes a housing, at least one disc drive assembly received in a front portion of the housing, first and second controllers, and an intermediate electronic component. The disc drive assembly includes a carrier supporting a disc drive having an Advanced Technology Architecture (ATA) data interface. The first and second controllers each include a data port corresponding to the disc drive. The intermediate electronic includes multiplexing electronics having first and second data communication paths. The first data communication path provides electronic communication between the data port of the first controller and the data interface of the disc drive. The second data communication path provides electronic communication between the data port of the second controller and the data interface of the disc drive. The multiplexing electronics selectively opens and closes the first and second data communication paths in response to at least one control signal.

23 Claims, 8 Drawing Sheets

DISC STORAGE SUBSYSTEM HAVING IMPROVED RELIABILITY

CROSS-REFERENCE TO RELATED APPLICATION

This application claims priority from U.S. Provisional Application Ser. No. 60/372,737 filed on Apr. 11, 2002.

FIELD OF THE INVENTION

The present invention relates generally to disc storage subsystems, and more particularly, but not by limitation, to a disc storage subsystem having redundant controllers for improved reliability.

BACKGROUND OF THE INVENTION

A disc storage subsystem generally includes a housing in which a plurality of disc drives are stored in removable carriers. Each disc drive includes a connector that interfaces with a corresponding connector of a midplane card to provide data communication therebetween. A controller, stored in a rear portion of the housing, includes an electrical connection with the midplane card for data communication with the disc drives. External processing electronics, such as a host computer, can access the data stored in the disc drives through the controller.

Each disc drive of the subsystem includes a data interface, through which the data stored therein is accessed. One such data interface is the Advanced Technology Architecture (ATA) data interface. This data interface can be serial (SATA) or parallel (PATA) data interface. The ATA data interface only provides single channel communication with the disc drive. Thus, disc storage subsystems using such ATA disc drives include only one controller, through which the data can be accessed by a host computer.

It is important that disc storage subsystems provide reliable data storage. To that end RAID (Redundant Array of Independent Disks) architectures are employed. In such architectures, the subsystem includes one or more additional disc drives storing redundant data. Thus, in the event of a disc drive failure the data is safely maintained by the other disc drives. Accordingly, such an arrangement can prevent the catastrophic loss of data.

Unfortunately, such a redundant arrangement of disc drives does not ensure that the data stored in the disc drives remains continuously accessible. Obviously, if a disc drive fails, the data stored in that particular disc drive becomes inaccessible, but is still accessible from the redundant disc drives. However, data stored in the disc drives becomes inaccessible in the event of a controller failure in a subsystem that utilizes ATA disc drives. In that case, the disc storage subsystem must be shut down and the controller replaced, before the data becomes accessible once again. This is commonly known as a single point of failure for the disc storage subsystem.

Embodiments of the present invention provide a solution to this and other problems, and offer advantages over the prior art.

SUMMARY OF THE INVENTION

The present invention is directed to a disc storage subsystem that allows continued access to data stored in its Advanced Technology Architecture (ATA) disc drives in the event of a controller failure. The disc storage subsystem includes a housing, at least one disc drive assembly, first and second controllers, and an intermediate electronic component. The disc drive assembly is received in a front portion of the housing and includes a disc drive contained in a carrier. The disc drive includes an ATA data interface including a connector. The first and second controllers each include a data port corresponding to the disc drive. The intermediate electronic component includes multiplexing electronics having first and second data communication paths. The first data communication path provides electronic communication between the data port of the first controller and the data interface of the disc drive. The second data communication path provides electronic communication between the data port of the second controller and the data interface of the disc drive. The multiplexing electronics selectively opens and closes the first and second data communication paths in response to at least one control signal. In this manner, redundant controllers are established in the disc storage subsystem such that data stored in one of the disc drives remains accessible to a host computer through either the first or the second controllers in the event that one of them fails.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
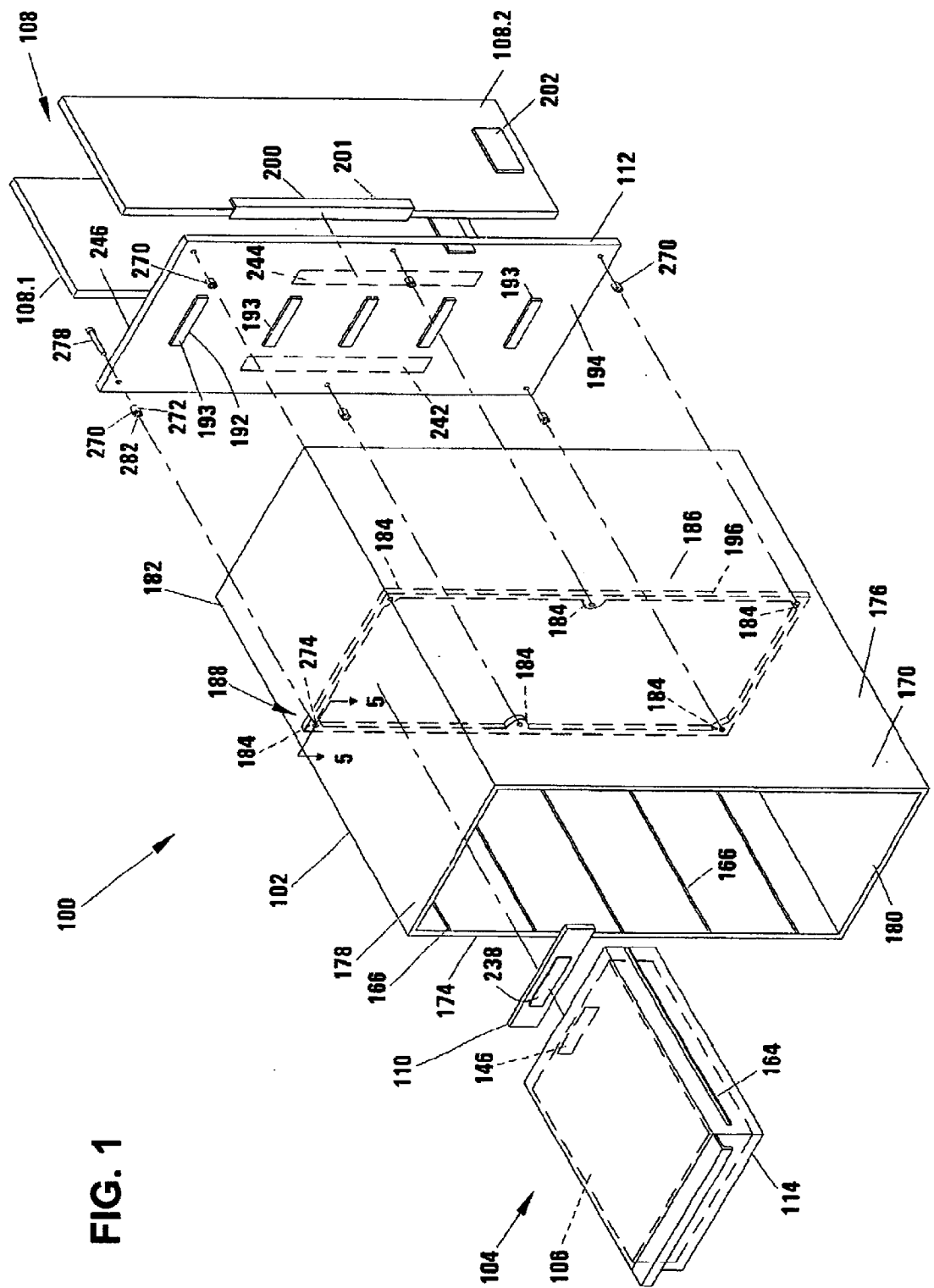
FIGS. 1 and 2 are simplified exploded perspective views of a disc drive storage subsystem that includes a midplane mounting assembly in accordance with embodiments of the invention.
Figure 2:
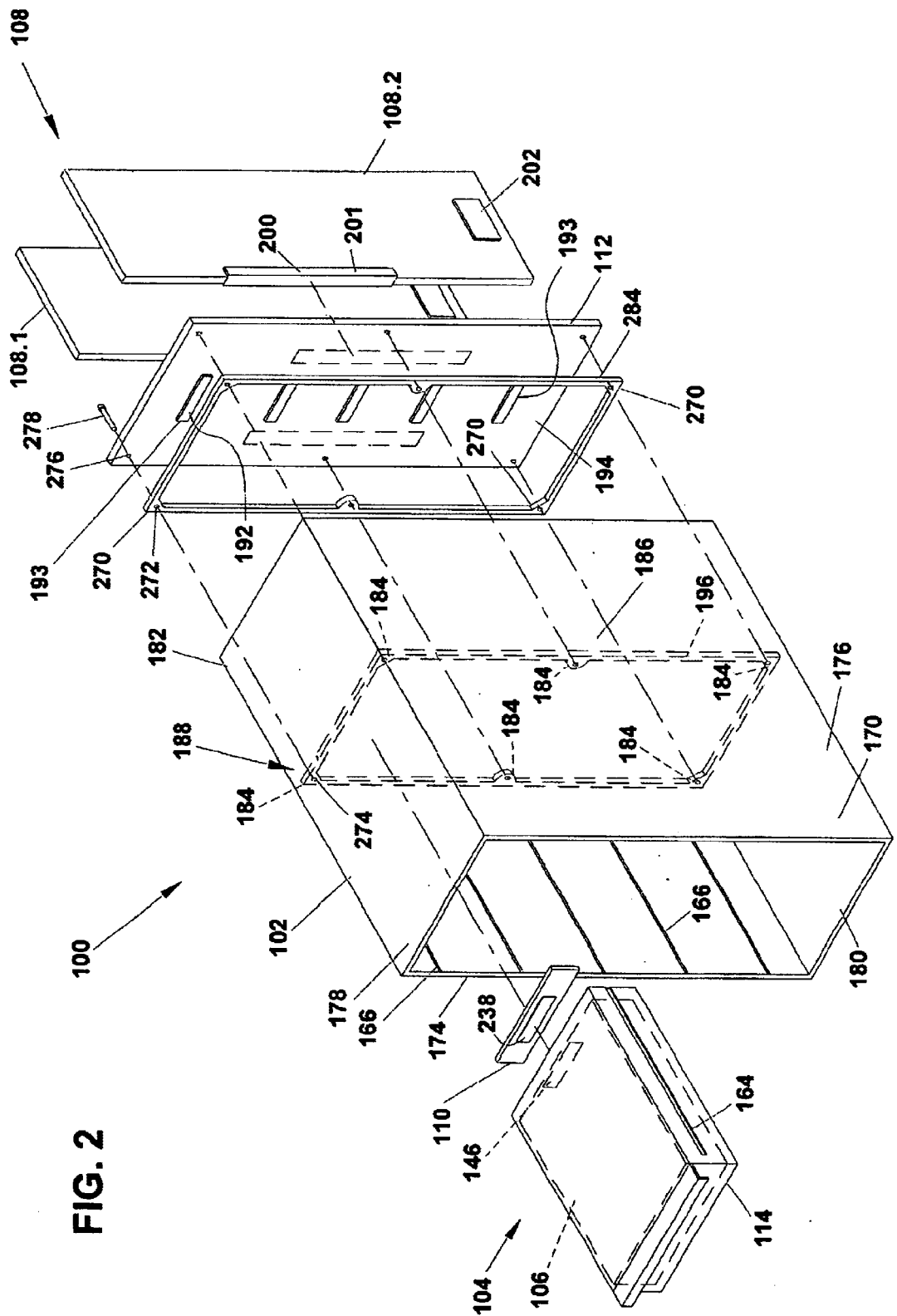

FIGS. 1 and 2 are exploded perspective views of a disc drive storage subsystem 100 in accordance with embodiments of the invention. Disc storage subsystem 100 generally includes a housing 102, one or more disc drive assemblies 104 each including a disc drive 106, a pair of controllers 108, one or more intermediate electronic components 110, and a midplane card 112. Disc storage subsystem 100 generally includes multiple disc drive assemblies 104. Only a single disc drive assembly 104 is depicted in FIGS. 1 and 2 to simplify the illustration. Additionally, FIGS. 1 and 2 are further simplified by not showing cooling fans, power supplies, and other conventional components of disc storage subsystem 100.

As will be discussed in greater detail below, the controllers 108 (individually labeled 108.1 and 108.2) and intermediate electronic component 110 operate to improve the reliability of disc storage subsystem 100. In operation, one or more external host computers access data stored in the disc drives 106 through controllers 108 and the intermediate electronic components 110. Each intermediate electronic component 110 determines which controller 108 is provided data access to a particular disc drive 106 by opening and closing data communication paths between the disc drive 106 and each of the controllers 108. In the event that one of the controllers 108 fails, data stored in the disc drives 106 can still be accessed by the host computer through the remaining active controller 108. In this manner, the reliability of disc storage subsystem 100 is improved.

Figure 3:
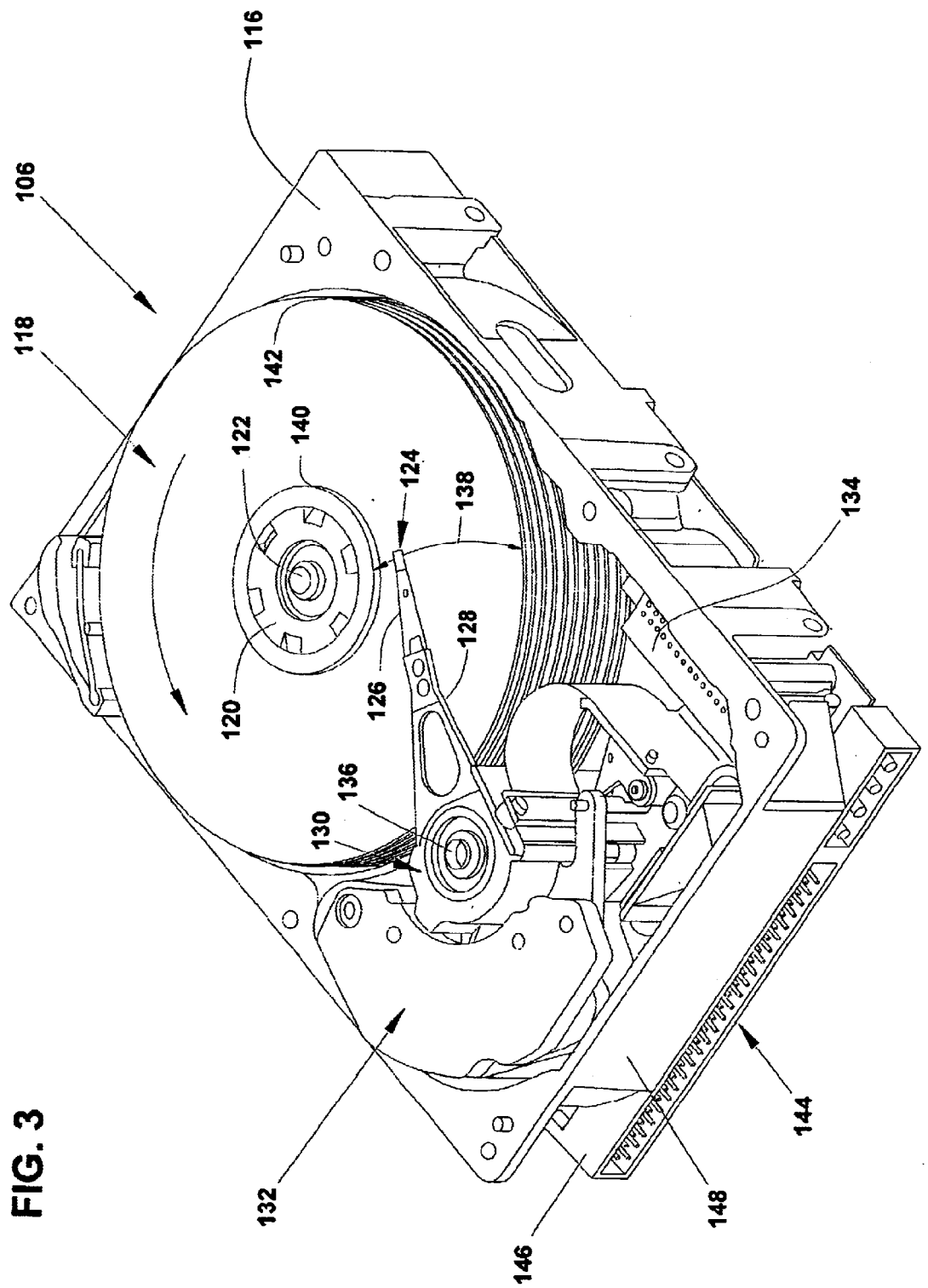
FIG. 3 is an isometric view of a disc drive.

Disc drive assemblies 104 each include a disc drive 106 that is contained in a carrier 114. FIG. 3 is an isometric view of an example of a disc drive 106 that can be used with disc storage subsystem 100. Disc drive 106 includes a housing with a base 116 and a top cover (not shown). Disc drive 106 also includes a disc pack 118, which is mounted on a spindle motor (not shown) by a disc clamp 120. Disc pack 118 includes a plurality of individual discs, which are mounted for co-rotation about central axis 122. Each disc surface has an associated disc head slider 124 which is mounted to disc drive 106 for communication with the disc surface. In the example shown in FIG. 3, sliders 124 are supported by suspensions 126, which are in turn attached to track accessing arms 128 of an actuator 130. Actuator 130, shown in FIG. 3, is of the type known as a rotary moving coil actuator and includes a voice coil motor, shown generally at 132. Voice coil motor 132, under the control of servo electronics 134, rotates actuator 130 with its attached heads 124 about a pivot shaft 136 to position heads 124 over a desired track along an arcuate path 138 between a disc inner diameter 140 and a disc outer diameter 142.

Disc drive 106 also includes a data interface 144 including a connector 146 located at rear side 148, through which data is communicated and power is provided to disc drive 106. Data interface 144 is a standardized data interface, such as either a Serial Advanced Technology Architecture (SATA) interface or a Parallel Advanced Technology Architecture (PATA) interface. Other data interfaces are also possible for disc drive 106. Disc drive 106 can preferably be removed without disturbing the operation of subsystem 100. Additionally, a Redundant Array of Independent Disks (RAID) architecture is preferably employed in disc storage subsystem 100 where subsystem 100 includes one or more additional disc drives 106 storing redundant data. This arrangement provides security against data loss due to disc drive failure.

Figure 4:
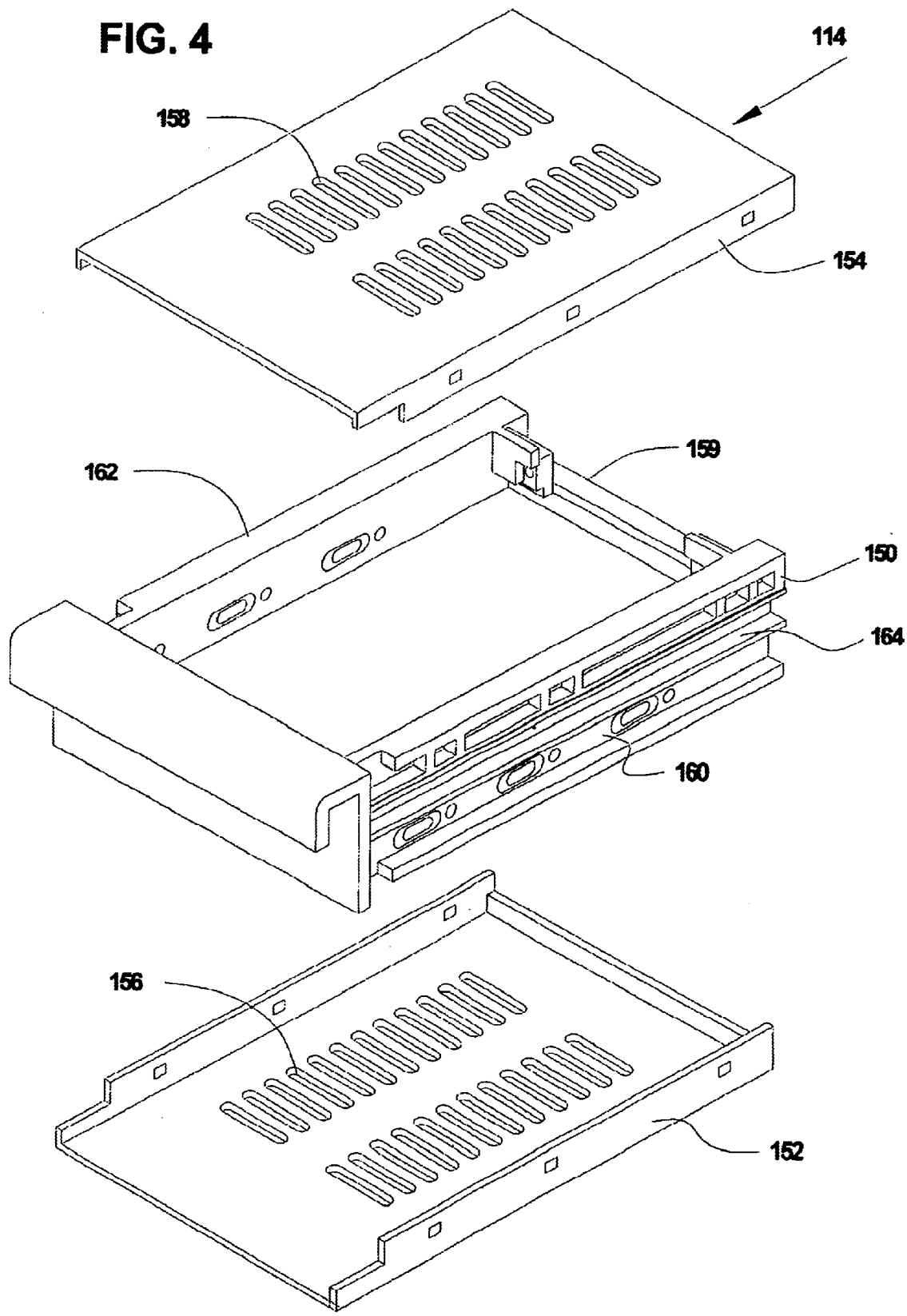
FIG. 4 is an exploded view of a conventional disc drive carrier.

FIG. 4 is an exploded view of a conventional disc drive carrier 114 in which disc drive 106 can be contained to form disc drive assembly 104. Carrier 114 generally includes a frame 150, a base 152 and a top cover 154. Base 152 mounts to frame 150 using screws or other means. Disc drive 106 is contained within the interior of carrier 114 and is secured to frame 150 with screws. Vents 156 and 158 of base 152 and top cover 154, respectively, allow for the dissipation of heat generated by disc drive 106. Carrier 114 also includes an opening in a rear side 159 to provide access to data interface 144 and connector 146 of disc drive 106.

Side walls 160 and 162 of frame 150 each include rail guides 164 that receive corresponding rails 166 (FIGS. 1 and 2) of housing 102. Disc drive assembly 104 is installed in housing 102 by aligning rails 166 of housing 102 with rail guides 164 of carrier 114. Once rails 166 are aligned with rail guides 164 of carrier 114, disc drive assembly 104 can slide in a rearward direction along rails 166 toward midplane card 112 to install disc drive assembly 104 within a front portion 170 of housing 102. Disc drive assembly 104 can be locked into position by a suitable locking mechanism.

Housing 102 protects and supports the components of disc storage subsystem 100. Housing 102 generally includes side walls 174 and 176, a top wall 178, and a bottom wall 180, as shown in FIGS. 1 and 2. Side walls 174 and 176 include rails 166 on an interior surface. An open front portion 170 allows for the installation of disc drive assemblies 104 as discussed above. An open rear portion 182 allows for the installation of midplane card 112, controllers 108 and other components of disc storage subsystem 100. Front and back covers (not shown) can be mounted to close off openings in front portion 170 and rear portion 182. Many alternative designs of housing 102 are possible. For example, one of the side walls 174 or 176 of housing 102 could include an opening, through which midplane card 112 is installed.

Figure 5:
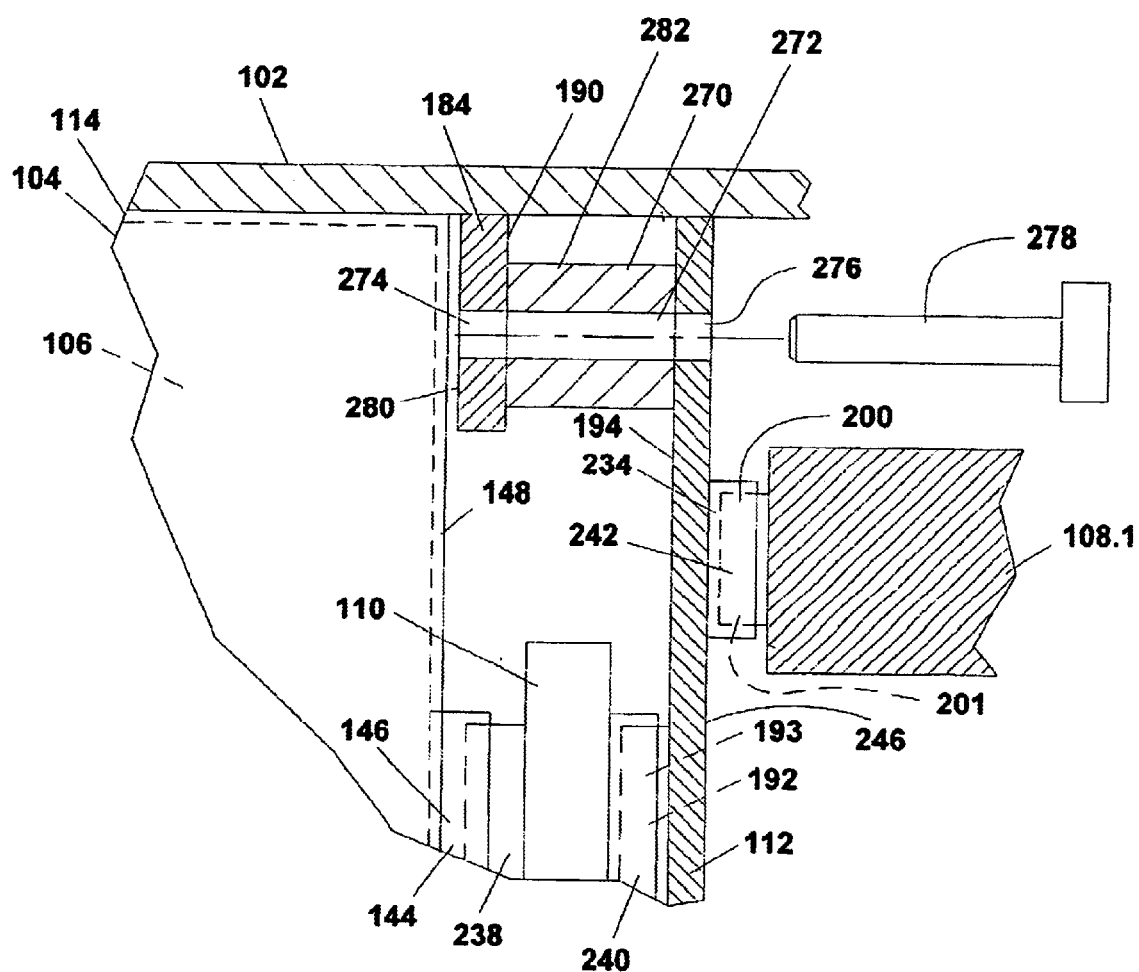
FIG. 5 is a simplified partial cross-sectional view of a midplane mounting region taken generally along line 5—5 of FIG. 1 and viewed from above when disc storage subsystem is assembled.

Midplane card 112 is mounted to midplane mounts 184 in a middle portion 186 of housing 102 between disc drive assemblies 104 and controllers 108, as shown in FIGS. 1, 2 and 5. FIG. 5 is a partial cross-sectional view of a midplane mounting region 188 (FIG. 1) taken generally along line 5—5 and viewed from above when disc storage subsystem 100 is assembled with at least one disc drive assembly 104. In accordance with one embodiment of the invention, midplane card 112 is positioned adjacent a rear side 190 of midplane mounts 184 and includes a front interface 192 having one or more connectors 193 on a front side 194, through which power and data communication can be provided to the disc drives 106. Midplane mounts 184 are preferably formed as a component of housing 102, but can be separate members that attach to the interior of housing 102. Midplane mounts 184 can also be formed integral with a frame 196 that mounts to middle portion 186 of housing 102, as shown in FIGS. 1 and 2.

Controllers 108 are configured to communicate with and control each disc drive 106 in the disc storage subsystem 100. Each controller 108 includes, along with other control electronics, an interface 200 having a connector 201, and cache memory 202, as illustrated in FIGS. 1 and 2. Data and control signals are communicated through interface 200. External processing electronics, such as a host computer, can access data stored in disc drives 106 through each of the controllers 108.

Figure 6:
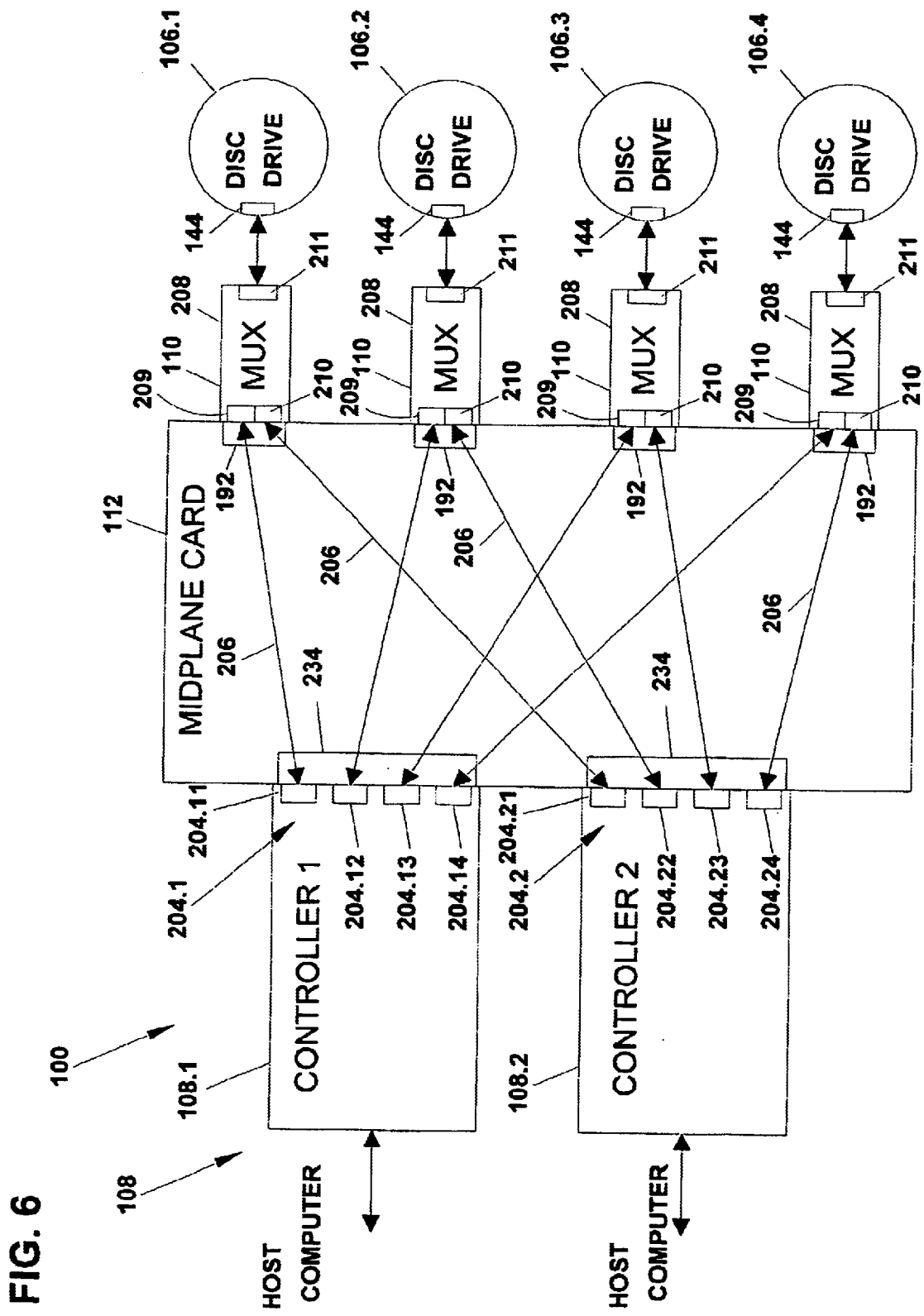
FIGS. 6 and 7 are schematic diagrams of a disc storage subsystem in accordance with various embodiments of the invention.
Figure 7:
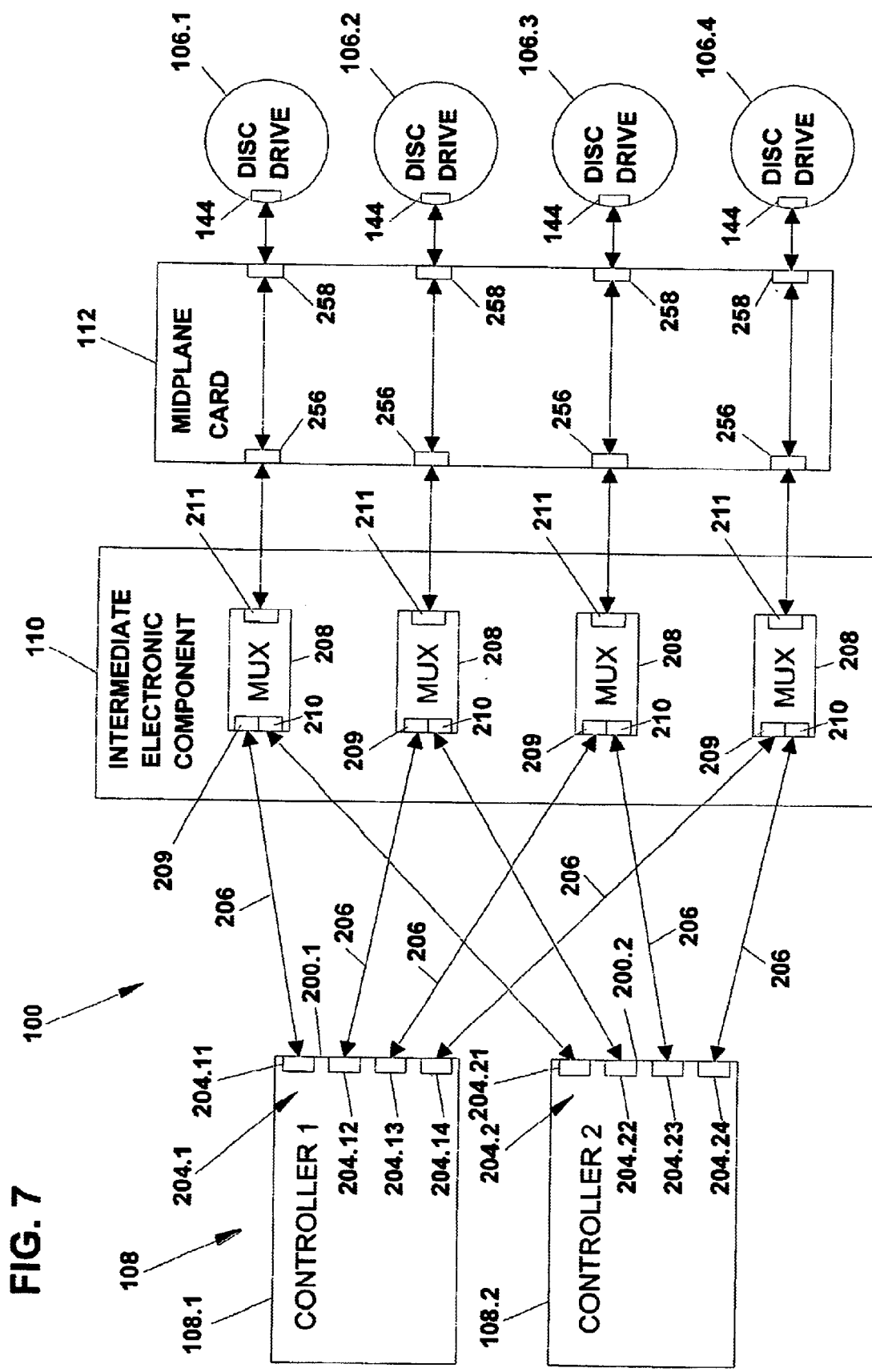
Figure 8:
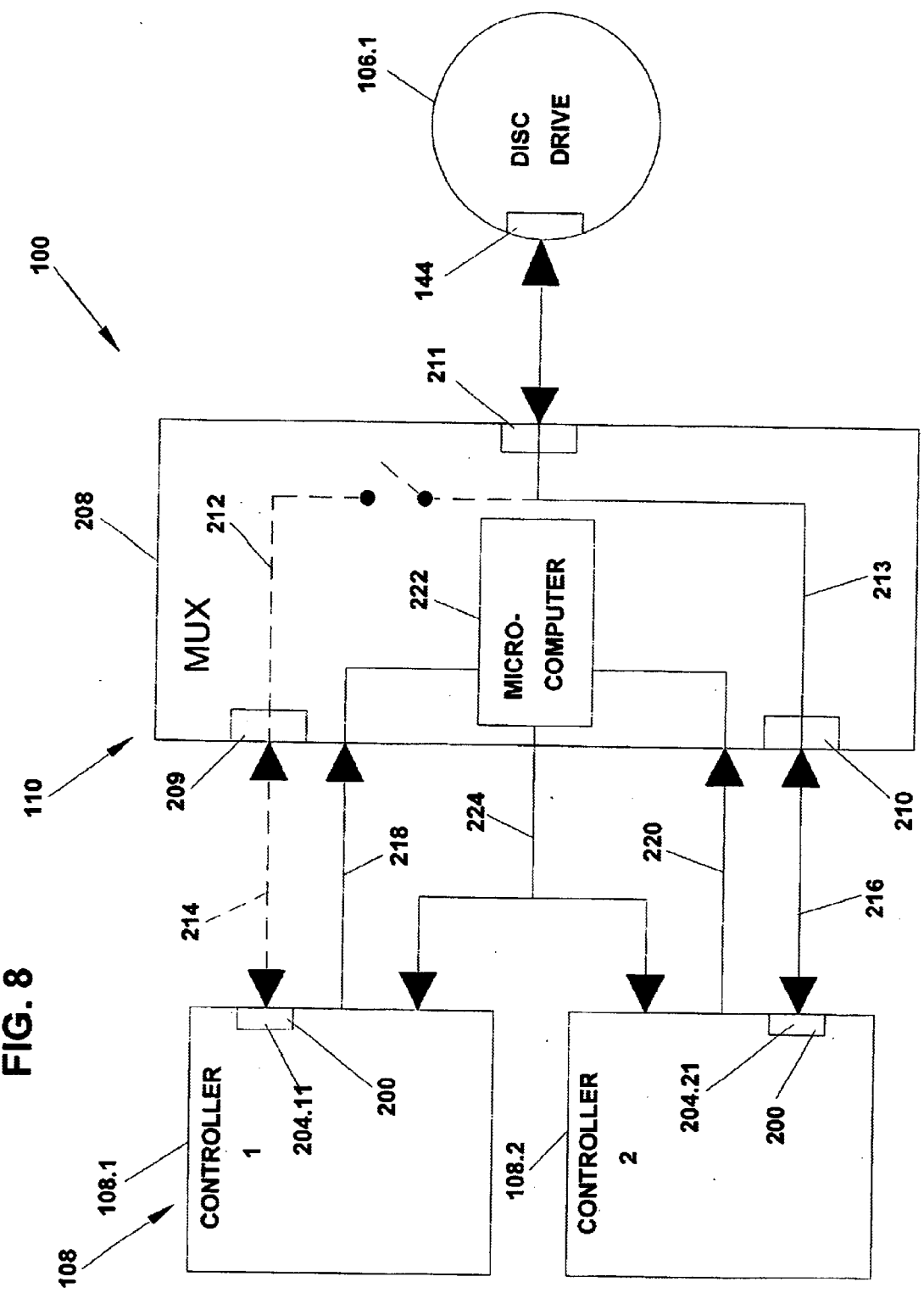
FIG. 8 is a schematic diagram of the basic elements of disc storage subsystem in accordance with embodiments of the invention.

Referring now to FIGS. 6–8, a more detailed description of the operation of disc storage subsystem 100 will be provided. FIGS. 6 and 7 are schematic diagrams of disc storage subsystem 100 and FIG. 8 is a schematic diagram of the basic elements of disc storage subsystem 100, in accordance with various embodiments of the invention.

As mentioned above, first and second controllers 108.1 and 108.2 provide host computers, or other external processing electronics, access to data stored in disc drives 106. Interface 200 of each controller 108 includes a plurality of data ports 204, each of which correspond to one of the disc drives 106. For instance, interface 200.1 of first controller 108.1 includes data ports 204.11–204.14, which respectively correspond to disc drives 106.1–106.4, and interface 200.2 of second controller 108.2 includes data ports 204.21–204.24, which respectively correspond to disc drives 106.1–106.4, as shown in FIGS. 6 and 7. The data ports 204 are accessed through the connectors 200 of each controller 108, shown in FIGS. 1, 2, and 5. Data and control signals can be communicated between the data ports 204 and the disc drives 106 as illustrated by arrows 206.

With reference to FIG. 8, a general description of the operation of the intermediate electronic component with be described. Each intermediate electronic component 110 includes multiplexing electronics (MUX) 208 that operates to selectively open and close data communication paths linking data interface 144 of a disc drive 106 to each of the controllers 108. Only the MUX 208 corresponding to disc drive 106.1 is shown in FIG. 8. For each MUX 208, the intermediate electronic component 110 includes a pair of controller interfaces 209 and 210 configured for communication with interfaces 200 of controllers 108, and a disc drive interface 211 configured for communication with data interface 144 of the corresponding disc drive 106. A first data path 212 between controller interface 209 and disc drive interface 211 of MUX 208 provides electronic communication between data port 204.11 of first controller 108.1 with the data interface 144 of disc drive 106.1, and a second data path 213 between controller interface 210 and disc drive interface 211 of MUX 208 provides electronic communication between data port 204.21 of second controller 108.2 with the data interface 144 of a disc drive 106.1. Each MUX 208 can selectively open and close the first and second data paths 212 and 213 to control which controller 108 is allowed to communicate with the corresponding disc drive 106. Typically, only one controller 108 will be allowed to communicate with the disc drive 106 at any given time, unless the disc drive 106 is configured for dual channel access. In FIG. 8, first data path 212 is depicted as being closed (open circuit) thereby preventing data communication (illustrated by phantom arrow 214) between first controller 108.1 and disc drive 106.1, while second data path 213 is depicted as being open (closed circuit) thereby allowing data communication (illustrated by arrow 216) between second controller 108.2 and disc drive 106.1.

MUX 208 controls the opening and closing of data paths 212 and 213 in response to at least one control signal from controllers 108. In accordance with one embodiment of the invention, first controller 108.1 directs a first interface enable control signal 218 to MUX 208 to request access to the corresponding disc drive 106. Likewise, second controller 108.2 directs a second interface enable control signal 220 to MUX 208 to request access to the corresponding disc drive 106. MUX 208 includes a micro-computer 222 that monitors the control signals and controls the opening and closing of data paths 212 and 213 in response thereto. In accordance with another embodiment of the invention, micro-computer 222 of MUX 208 produces a status signal output 224 that is directed to each of the controllers 108 to inform controllers 108 whether the first data path 212 or second data path 213 is open. Many other suitable methods of controlling the opening and closing of the data paths 212 and 213 can also be employed.

Disc storage subsystem 100 can include multiple intermediate electronic components 110 each containing a single MUX 208, as shown in FIG. 6, or a single intermediate electronic component 110 containing a MUX 208 for each disc drive 106 of subsystem 100, as shown in FIG. 7. Additionally, the intermediate electronic component 110 can provide a communication link either between the disc drives 106 and midplane card 112, as shown in FIG. 6, or between the controllers 108 and midplane card 112, as shown in FIG. 7. In accordance with the embodiment depicted in FIG. 6, the controller interfaces 209 and 210 of each intermediate electronic component electrically couple to the corresponding interfaces 200.1 and 200.2 of controllers 108.1 and 108.2 through front and rear interfaces 192 and 234 of mid plane card 112, respectively. Thus, data, control signals, and/or power, illustrated by arrows 236, can be communicated between the data ports 204 of each controller 108 to the controller interfaces 209 and 210 of each MUX 208 through the rear and front interfaces 234 and 192 of midplane card 112. The signals can then be routed to each disc drive 106 through the disc drive interface 211 of the corresponding intermediate electronic component 110.

All of the interfaces of the components of disc storage subsystem 100 are preferably standardized, such as serial or parallel ATA interfaces, having standardized connectors, such as fiber channel connectors, that are mechanically and electrically compatible with each other. Accordingly, the disc drive interface 211 of each intermediate electronic component 110 can include a disc drive connector 238 that is mechanically and electrically compatible with connector 146 of disc drive 106, and the controller interfaces 209 and 210 can include a midplane connector 240 that is mechanically and electrically compatible with a connector 193 of front interface 192 of midplane card 112, as shown in FIG. 5. Likewise, rear interface 234 of midplane card 112 includes a pair of rear connectors 242 and 244 on a rear side 246 that are preferably electrically and mechanically compatible with connectors 201 of controllers 108, as shown in FIGS. 1 and 5. Once all of the connections between the interfaces of the components are made, either through direct connection of the corresponding connectors or by other means, the first and second communication links 212 and 213 between the data ports 204 of controllers 108 and disc drives 106 are established for the communication of data, control signals, and/or power therebetween.

In accordance with the embodiment depicted in FIG. 7, an intermediate electronic component 110 having a plurality of MUX's 208 is positioned between midplane card 112 and controllers 108. Alternatively, multiple intermediate electronic components 110 each having a MUX 208 could be utilized. In accordance with this embodiment, the controller interfaces 209 and 210 of intermediate electronic component 110 are configured for communication of data, control signals, and/or power, with interfaces 200.1 and 200.2 of controllers 108.1 and 108.2 and the corresponding data ports 204. Additionally, the disc drive interfaces 211 for each MUX 208 are configured for communication of data, control signals, and/or power with a corresponding rear interface 256 of midplane card 112. Midplane card 112 also includes disc drive interfaces 258, each of which can provide the data, control signals and/or power received from the corresponding MUX 208 to a data interface 144 of a disc drive 106.

As with the embodiment discussed above, all of the interfaces of the components of disc storage subsystem 100 are preferably standardized, such as serial or parallel ATA interfaces, having standardized connectors, such as fiber channel connectors, that are mechanically and electrically compatible with each other. Once all of the connections between the interfaces of the components are made, either through direct connection of the corresponding connectors or by other means, the first and second communication links 212 and 213 between the data ports 204 of controllers 108 and disc drives 106 are established for the communication of data, control signals, and/or power therebetween. One advantage to this embodiment of the invention is that midplane card 112 can be configured for single-channel communication. This arrangement can eliminate the need to replace the midplane card when, for example, the disc storage subsystem is updated from having a single controller to having dual controllers in accordance with the present invention.

Another aspect of the invention is directed to a method of improving reliability of an existing disc storage subsystem that utilizes a single controller by adding at least one intermediate electronic component 210 and at least one additional controller 108. Alternatively, the single controller of the disc storage subsystem that is being updated can be replaced with redundant controllers 108. Initially, at least one intermediate electronic component 110 is provided. As discussed above, the intermediate electronic component 210 preferably includes MUX's 208 having first and second controller interfaces 209 and 210, a disc drive interface 211, and first and second data communication paths 212 and 213, as shown in FIG. 8. Next, electronic communication links are established between the controller interfaces 209 and 210 for each MUX 208 and interfaces 200 of controllers 108, and between the disc drive interface 211 and the data interface 144 of disc drive 106. These communication links can be established through a midplane card 112 as illustrated in the embodiments depicted in FIGS. 6 and 7. Finally, each MUX 208 of intermediate electronic component 110 opens and closes the first and second data communication paths 211 and 213 in response to at least one control signal, such as 218 or 220 shown in FIG. 8.

One problem that can be encountered when transforming a disc storage subsystem having only a single controller, to one having redundant controllers is a lack of space between midplane card 112 and rear side 148 of the disc drives 106 that is necessary to accommodate the intermediate electronic component 110. This problem is solved by positioning spacers 270 between rear side 190 of midplane mounts 184 and front side 194 of midplane card 112, as illustrated in FIGS. 1, 2 and 5. Spacers 270 operate to displace midplane card 112 toward rear portion 182 of housing 102 to thereby generate space for intermediate electronic component 110 between disc drive 106 and midplane card 112 to form the embodiment of disc storage subsystem 100 depicted in FIG. 6. Spacers 270 can be formed of plastic, rubber, metal, or other suitable material.

Spacers 270 can take on many different forms while providing the desired displacement of midplane card 112 toward rear portion 182 of housing 102. Spacers 270 preferably include a bore 272 that is aligned with an aperture 274 of midplane mount 184 and an aperture 276 of midplane card 112. A fastener 278 can be inserted through apertures 274 and 276 and bore 272 to facilitate securing midplane card 112 to midplane mounts 184 and housing 102. Aperture 274 of midplane mount 184 is preferably threaded to receive fastener 278 in the form of a bolt or screw. Alternatively, a nut (not shown) can be positioned on front side 280 of midplane mount 184 to receive fastener 278. Other types of fasteners such as, for example, rivets, adhesive, etc., can be used to secure midplane card 112 to spacer 270 and spacer 270 to midplane mount 184.

In accordance with one embodiment of the invention, spacers 270 are formed of individual members that are mounted between midplane mounts 184 and midplane card 112 at each mounting location, as illustrated in FIG. 1. Spacers 270 preferably include a cylindrical member 282 having bore 272 for receiving fastener 278, as shown in FIGS. 1 and 5. In accordance with another embodiment of the invention, spacers 270 are joined in a single planar member 284, as shown in FIG. 2, where bores 272 are positioned to align with apertures 274 of midplane mounts 184 and apertures 276 of midplane card 112. Planar member 280 is preferably a frame-like structure that provides support to the peripheral edge of midplane card 112.

In summary, the present invention is directed to disc storage subsystem (such as 100) that includes a housing (such as 102), at least one disc drive assembly (such as 104), first and second controllers (such as 108.1 and 108.2), and an intermediate electronic component (such as 110). The disc drive assembly is received in a front portion (such as 170) of the housing and includes a disc drive (such as 106) contained in a carrier (such as 114). The disc drive includes an Advanced Technology Architecture (ATA) data interface (such as 144) including a connector (such as 146). The first and second controllers each include a data port (such as 204.11 and 204.12) corresponding to the disc drive. The intermediate electronic component includes multiplexing electronics (such as MUX 208) having first and second data communication path (such as 212 and 213). The first data communication path provides electronic communication between the data port of the first controller and the data interface of the disc drive. The second data communication path provides electronic communication between the data port of the second controller and the data interface of the disc drive. The multiplexing electronics selectively opens and closes the first and second data communication paths in response to at least one control signal (such as 218 or 220). In this manner, redundant controllers are established in the disc storage subsystem such that data stored in one of the disc drives remains accessible to a host computer through either the first or the second controllers in the event that one of them fail.

In accordance with another embodiment of the invention, the disc storage subsystem includes a midplane card (such as 112) adjacent midplane mounts (such as 184) of the housing (such as 102) having a front connector (such as 193) on a front side (such as 194), and first and second rear connectors (such as 242 and 244) on a rear side (such as 246). The intermediate electronic component includes a disc drive connector (such as 238) mated to the connector of the disc drive, and a midplane connector (such as 240) mated to the front connector of the midplane card. The first and second rear connectors of the midplane card are respectively mated to the data ports of the first and second controllers.

The disc storage subsystem can also include spacers (such as 270) between a rear side (such as 190) of the midplane mounts and the midplane card. The spacers displace the midplane card from the midplane mounts toward a rear portion (such as 182) of the housing. A plurality of fasteners (such as 278) can extend through an aperture (such as 276) of the midplane card, a bore (such as 272) of one of the spacers, and an aperture (such as 274) of one of the midplane mounts to thereby facilitate securing the midplane card to the midplane mounts. The spacers can be cylindrical members (such as 282) or formed integral with a planar member (such as 284).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. Thus, the particular elements may vary depending on the particular application for the disc storage system while maintaining substantially the same functionality without departing from the scope and spirit of the present invention. For example, the midplane card could incorporate the intermediate electronic component to thereby reduce the number of components in the disc storage subsystem and conserve space.

What is claimed is:

1. A disc storage subsystem comprising:
   a housing;
   a disc drive assembly received in a front portion of the housing and including a disc drive contained in a carrier, the disc drive having an Advanced Technology Architecture (ATA) data interface including a connector;

first and second controllers, each having a data port; and an intermediate electronic component including multiplexing electronics having a first data communication path providing electronic communication between the data port of the first controller and the data interface of the disc drive, and a second data communication path providing electronic communication between the data port of the second controller and the data interface of the disc drive, the multiplexing electronics selectively opening and closing the first and second data communication paths in response to at least one control signal.

2. The disc storage subsystem of claim 1, wherein the data interface of the disc drive is a serial ATA interface or a parallel ATA interface.

3. The disc storage subsystem of claim 1, wherein the control signals include first and second interface enable control signals from the respective first and second controllers for requesting access to the data interface of the disc drive.

4. The disc storage subsystem of claim 1, wherein the multiplexing electronics includes a status signal output indicative of whether the first or second data communication path is open.

5. The disc storage subsystem of claim 1, wherein:

the intermediate electronic component includes a disc drive connector mated to the connector of the disc drive, and a midplane connector; and the disc storage subsystem includes a midplane card adjacent midplane mounts of the housing, the midplane card having a front connector on a front side mated to the midplane connector of the intermediate electronic component, and first and second rear connectors respectively mated to the data ports of the first and second controllers.

6. The disc storage subsystem of claim 5, including spacers between a rear side of the midplane mounts and the midplane card, whereby the midplane card is displaced from the midplane mounts toward a rear portion of the housing.

7. The disc storage subsystem of claim 6, including a plurality of fasteners each extending through an aperture of the midplane card, a bore of one of the spacers, and an aperture of one of the midplane mounts to thereby facilitate securing the midplane card to the midplane mounts.

8. The disc storage subsystem of claim 6, wherein the spacers each include a cylindrical member.

9. The disc storage subsystem of claim 6, wherein the spacers are formed integral with a planar member.

10. A disc storage subsystem comprising:

a housing;

a plurality of disc drive assemblies, each received in a front portion of the housing and including a disc drive contained in a carrier, each disc drive having an Advanced Technology Architecture (ATA) data interface including a connector;

a first controller having a plurality of data ports, each of which correspond to one of the disc drives;

a second controller having a plurality of data ports, each of which correspond to one of the disc drives; and a plurality of intermediate electronic components, each including multiplexing electronics having a first data communication path providing electronic communication between one of the data ports of the first controller and the data interface of the corresponding disc drive, and a second data communication path providing electronic communication between one of the data ports of the second controller and the data interface of the corresponding disc drive, the multiplexing electronics of each intermediate electronic component selectively opening and closing the first and second data communication paths in response to at least one control signal.

11. The disc storage subsystem of claim 10, wherein the data interface of the disc drive is a serial ATA interface or a parallel ATA interface.

12. The disc storage subsystem of claim 10, wherein the control signals include first and second interface enable control signals from the respective first and second controllers for requesting access to the data interface of the corresponding disc drive.

13. The disc storage subsystem of claim 10, wherein the multiplexing electronics of each intermediate electronic component includes a status signal output indicative of whether the first or second data communication path is open.

14. The disc storage subsystem of claim 10 wherein:

the intermediate electronic components each include a disc drive connector mated to the connector of the disc drive, and a midplane connector; and the disc storage subsystem includes a midplane card positioned adjacent midplane mounts of the housing, the midplane card having a plurality of front connectors on a front side each mated to the midplane connector of one of the intermediate electronic components, and first and second rear connectors respectively mated to the data ports of the first and second controllers.

15. The disc storage subsystem of claim 14, including spacers between a rear side of the midplane mounts and the midplane card, whereby the midplane card is displaced from the midplane mounts toward a rear portion of the housing.

16. The disc storage subsystem of claim 15, including a plurality of fasteners, each extending through an aperture of the midplane card, a bore of one of the spacers, and an aperture of one of the midplane mounts to thereby facilitate securing midplane cards in the midplane mounts.

17. The disc storage subsystem of claim 15, wherein the spacers each include a cylindrical member.

18. The disc storage subsystem of claim 15, wherein the spacers are formed integral with a planar member.

19. A method of improving reliability of a disc storage subsystem including a housing having a front portion configured to receive at least one disc drive assembly, including a carrier containing a disc drive having an Advanced Technology Architecture (ATA) data interface, through which data communication is established with a single controller, the method comprising steps of:

a) providing an intermediate electronic component including multiplexing electronics having a disc drive interface, first and second controller interfaces, a first data communication path providing electronic communication between the disc drive interface and the first controller interface, and a second data communication path providing electronic communication between the disc drive interface and the second controller interface;

b) establishing an electronic communication link between the disc drive interface of the intermediate electronic component and the data interface of the disc drive;

c) establishing electronic communication links between the first and second controller interfaces of the intermediate electronic component and data ports of first and second controllers, respectively; and d) selectively opening and closing the first and second data communication paths in response to at least one control signal using the multiplexing electronics.

20. The method of claim 19, wherein the establishing step c) includes steps of:

c)(1) providing a midplane card having a front connector on a front side and a pair of rear connectors on a rear side;

c)(2) connecting a midplane connector of the first and second controller interfaces of the intermediate electronic component to the front connector of the midplane card; and c)(3) connecting the pair of rear connectors of the midplane card to the data ports of the first and second controllers; whereby the electronic communication links are established between the intermediate electronic component and the data ports of the first and second controllers.

21. The method of claim 19 wherein the establishing step c) includes steps of:

c)(1) providing a midplane card having a front connector on a front side and a pair of rear connectors on a rear side;

c)(2) providing midplane mounts at a middle portion of the housing;

c)(3) installing spacers between a rear side of the midplane mounts and the front side of the midplane card;

c)(4) securing the midplane card to the midplane mounts;

c)(5) connecting a midplane connector of the first and second controller interfaces of the intermediate electronic component to the front connector of the midplane card; and c)(6) connecting the pair of rear connectors of the midplane card to the data ports of the first and second controllers; whereby the electronic communication links are established between the intermediate electronic component and the data ports of the first and second controllers.

22. A disc storage subsystem comprising:

a housing;

a disc drive assembly received in a front portion of the housing and including a disc drive contained in a carrier, the disc drive having an Advanced Technology Architecture (ATA) data interface including a connector;

first and second controllers, each having a data port configured to receive data from the disc drive; and a multiplexing means for selectively establishing electronic communication links between the data ports of the first and second controllers and the data interface of the disc drive.

23. The disc storage subsystem of claim 22, wherein the multiplexing means includes an intermediate electronic component having multiplexing electronics including a first data communication path providing electronic communication between the data port of the first controller and the data interface of the disc drive, and a second data communication path providing electronic communication between the data port of the second controller and the data interface of the disc drive, the multiplexing electronics selectively opening and closing the first and second data communication paths in response to at least one control signal.

* * * * *